United States Patent [19]

Chapelet et al.

[11] 4,092,255

[45] May 30, 1978

[54] NOVEL LUBRICATING COMPOSITIONS CONTAINING NITROGEN CONTAINING HYDROCARBON BACKBONE POLYMERIC ADDITIVES

[75] Inventors: Gilbert Chapelet, Bron; Hubert Knoche, Meyzieu; Gilbert Marie, Pau, all of France

[73] Assignee: Entreprise de Recherches et d'Activites Petrolieres (E.R.A.P.), Paris, France

[21] Appl. No.: 638,521

[22] Filed: Dec. 8, 1975

[30] Foreign Application Priority Data

Dec. 12, 1974  France .................................. 74 40947
Dec. 12, 1974  France .................................. 74 40948

[51] Int. Cl.$^2$ .............................................. C10M 1/32
[52] U.S. Cl. ...................................... 252/50; 252/47; 252/47.5; 252/51.5 A
[58] Field of Search ........................................... 252/50

[56] References Cited

U.S. PATENT DOCUMENTS

| 3,182,024 | 5/1965  | Stuart et al. ............................ 252/50 |
| 3,360,506 | 12/1967 | De Benneville et al. .......... 252/50 X |
| 3,378,492 | 4/1968  | Song et al. ........................... 252/50 X |
| 3,404,091 | 10/1968 | Takashima et al. ..................... 252/50 |
| 3,423,367 | 1/1969  | Merijan et al. ..................... 252/50 X |
| 3,445,387 | 5/1969  | Liston ................................. 252/50 X |
| 3,488,294 | 1/1970  | Annand et al. .................... 252/50 X |
| 3,728,319 | 4/1973  | Kiesel et al. ....................... 252/50 X |

Primary Examiner—Delbert E. Gantz
Assistant Examiner—Andrew H. Metz
Attorney, Agent, or Firm—Burgess, Ryan and Wayne

[57] ABSTRACT

There are disclosed novel lubricating compositions containing a major proportion of a lubricating oil and a minor proportion of an oil soluble polymer additive, and possibly other additives, wherein said polymer additive is a copolymer of ethylene, a monoolefin having 3 to 6 carbon atoms or a monoolefin having 3 to 6 carbon atoms and a non-conjugated diene with one or more specific nitrogenous monomers, said polymer having a reduced viscosity, measured in decalin at 135° C, comprised between 0.5 and 2 and a polydispersity lower than 5.

Such a polymer additive improves the oil viscosity index while ensuring the dispersion of the slurry it may contain.

18 Claims, No Drawings

NOVEL LUBRICATING COMPOSITIONS CONTAINING NITROGEN CONTAINING HYDROCARBON BACKBONE POLYMERIC ADDITIVES

The present invention relates to improved lubricating compositions containing a major proportion of a lubricating oil and a minor proportion of an oil-soluble specific nitrogenous polymer additive, said additive improving the oil viscosity index as well as ensuring the dispersion of the slurry it may contain.

Lubricating oils, and more particularly those used in the crank-cases of internal combustion engines, are known to contain various additives for improving the performance of said oils during their use. Some additives are used to increase the oil viscosity index while others ensure, for instance, that the insoluble deposits, also called slurry, which will form in the oil, are maintained in a suspended state.

The additives used for improving the oil viscosity index must have, on the one hand, a sufficient thickening effect on a light lubricating oil at high temperatures to make the lubricating properties of said oil similar to those of a heavier lubricating oil and, on the other hand, a limited thickening effect on a light lubricating oil at low temperatures to avoid impairing the properties of said oil at said low temperatures. They are generally long-chain polymer compounds such as, for example, polyisobutene, polymethacrylates, polyalkylstyrenes, partially hydrogenated copolymers of butadiene and styrene, and amorphous copolymers of ethylene and propene.

The additives which maintain the crank-case clean are, on the one hand, detergents such as, for example, sulphonates, phenates or organic phosphates of polyvalent metal, particularly efficient during "hot" running of the engine (as in a diesel engine), and on the other hand, dispersing agents such as, for example, the succinimides or succimic esters, alkylated by a polymer of isobutene or propene, on the carbon in alpha position of the succinimide carbonyl, these additives being operative more particularly during "cold" running of the engine, which is the case of the cars stopping frequently.

Additives for lubricating oils have also been proposed to provide simultaneously the improvement of the oil viscosity index and the dispersion of the slurry they may contain. Such additives are, for example, graft copolymers resulting from the grafting of acrylonitrile or aminoalkyl methacrylates on amorphous copolymers of ethylene and propene, or also statistic copolymers obtained by radical polymerization of acrylates or alkyl methacrylates with vinyllactames such as N-vinylpyrolidone or aminoalkyl methacrylates.

However, these additives and more particularly those which have to perform several functions are not always fully satisfactory in the long run.

The present invention relates to improved lubricating compositions cntaining a specific polymer additive which is efficient both as an agent for improving the viscosity index and as a dispersing agent, and which can advantageously replace the additives hitherto proposed for that purpose.

An object of the present invention is to provide lubricating compositions containing a major proportion of a lubricating oil and a minor proportion of an oil-soluble polymer additive adapted to improve the oil viscosity index and to disperse the slurry it may contain, and possibly other additives, wherein said polymer additive is an olefinic copolymer containing, by weight, $x\%$ units derived from ethylene, $y\%$ unites derived from a mono-olefin having 3 to 6 carbon atoms or from a mono-olefin having 3 to 6 carbon atoms and a non-conjugated diene, the proportion of units resulting from the diene being equal to or lower than 20%, and $z\%$ units derived from one or more nitrogenous monomers selected from the group comprising the vinylimidazoles, the vinylimidazolines and their derivatives obtained by replacing the hydrogen atoms linked to the heterocycle carbon by hydrocarbon groups, possibly aminated, and the nitrogenous heterocyclic compounds of formula R-B wherein R represents a monovalent alkenyl radical having 2 to 12 carbon atoms, more particularly 2 to 8 carbon atoms and preferably with the unsaturation in the $\omega$ position, and B is the monovalent heterocyclic group obtained by removing the hydrogen atom linked to the substitutable heteroatom of an heterocyclic compound selected from the group comprising the carbazole, the thiobenzothiazole, the phenothiazine, the lactams or thiolactams having 4 to 14 nuclear carbon atoms, and the derivatives of these compounds formed by replacing the hydrogen atoms linked to the nuclear carbons by monovalent hydrocarbon radicals, possibly aminated, having 1 to 8 carbon atoms, the values of $x$, $y$ and $z$ being such that $5 \leq x \leq 75$, $5 \leq y \leq 85$ and $0.1 \leq z \leq 20$ with $(x + y + z) = 100$, said copolymer havng a reduced viscosity, as measured in a solution at 0.1%, in decalin at 135° C, comprised between 0.5 and 2, and a polydispersity lower than 5.

The mono-olefins having 3 to 6carbon atoms, that are present in the polymer additives according to the invention are more particularly alpha-olefins such as propene, butene-1, pentene-1, methyl-4 pentene-1 and hexene-1, the preferred alpha-olefins being propene and butene-1.

As to the non-conjugated dienes, from which up to 20% units of the additive copolymer may possibly derive, they may be of linear of cyclic nature and be selected particularly from the group comprising the 1,4-hexadiene, methyl-2-pentadiene, 1,4-cyclopentadiene, 1,5-cyclooctadiene tetrahydro-4.7.8.9.indene, bicyclo-(3.2.0)-heptadiene, dicyclopentadiene, alkylidene-5 norbornene-2 such that, for example, methylene-5 norbornene-2 and ethylidene-5 norbornene-2.

The nitrogenous heterocyclic monomers of the imidazole or imidazoline type are more particularly the vinylimidazoles and vinylimidazolines having the vinyl group in the 1 or 2 position, i.e. on the substitutable nitrogen atom or on the carbon atom in alpha position of said nitrogen atom, and the compounds derived from these monomers by substituting the hydrogen atoms linked to the heterocycle carbons by monovalent hydrocarbon groups having 1 to 8 carbon atoms selected from the group comprising the alkyl, aryl, aralkyl and alkaryl radicals, possibly aminated, and/or by substituting the hydrogen atoms of the two adjacent carbon atoms of the heterocycle by a divalent hydrocarbon group, possibly aminated, having 4 to 8 carbon atoms to form with said adjacent carbon atoms of the heterocycle a carbon nucleus, and particularly an aromatic nucleus. Non-limitative examples of such nitrogenous monomers are N-vinylimidazole (also called vinyl-1 imidazole), N-vinyl methyl-2 imidazole, N-vinyl ethyl-2 imidazole, N-vinyl phenyl-2 imidazole, N-vinyl dimethyl-2.4 imidazole, N-vinylbenzimidazole, N-vinyl methyl-2 benzimidazole, N-vinylimidazoline (also named vinyl-1 imidazoline), N-vinyl methyl-2 imidazoline, N-vinyl phenyl-2 imidazoline and vinyl-2 imidazole.

As previously indicated, the heterocyclic monomers of the R-B type are unsaturated compounds constituted by a monovalent alkenyl rest having 2 to 12 carbon atoms, linked to a monovalent nitrogenous heterocyclic group derived, by removal of the hydrogen atom linked to the substitutable hetero-atom, from a compound selected from the group comprising the carbazole, the thiobenzothiazole, the phenothiazine, the lactams and thiolactams having 4 to 15 nuclear carbon atoms, and the derivatives of these compounds obtained by substituting the hydrogen atoms linked to the nuclear carbons by hydrocarbon radicals, possibly aminated and having 1 to 8 carbon atoms.

Said nitrogenous heterocyclic monomers are more particularly selected from the group comprising the alkenyl1-2 thiobenzothiazoles, the N-alkenyl-carbazoles, the N-alkenylphenothiazines, the N-alkenyllactames, or N-alkenyl-thiolactams having 4 to 12 nuclear carbon atoms, wherein the alkenyl radical has 2 to 8 carbon atoms and wherein the unsaturation is preferably in the ω position relative to the hetero-atom to which it is linked, and the derivatives of these compounds obtained by substituting the hydrogen atoms linked to the nuclear carbons by alkyl radicals having 1 to 6 carbon atoms, or by a phenyl radical.

Among the monomers derived from carbazole, the following may be particularly mentioned : N-vinylcarbazole, N-allylcarbazole, N-butenyl-carbazole, N-hexenylcarbazole and N-(Methyl-1'ethenyle) carbazole.

The monomers resulting from thiobenzothiazole and phenothiazine may be advantageously the 2-vinyl thiobenzothiazole, the 2-allylthiobenzothiazole, the 2-butenylthiobenzothiazole, the N-vinylphenothiazine, the N-allylphenothiazine, the most commonly used being the 2-allylthiobenzothiazole and the N-allylphenothiazine.

As examples of monomers derived from lactams or thiolactams, the following compounds may be particularly mentioned : N-vinyl pyrrolidone, N-vinyl methyl-5 pyrrolidone, N-vinylmethyl-3 pyrrolidone, N-vinylethyl-5 pyrrolidone, N-vinyldimethyl-5, 5-pyrrolidone, N-vinylphenyl-5 pyrrolidone, N-allylpyrrolidone, N-vinylthiopyrrolidone, N-vinylpiperidone N-vinyl-diethyl-6.6 piperidone, N-vinyl Caprolactam, N-vinylmethyl-7 caprolactam, N-vinylethyl-7 caprolactam, N-vinyldimethyl-7.7 caprolactam, N-vinylthiocaprolactam, N-allylcaprolactam, N-vinylcapryllactam.

The reduced viscosity of the polymer additives according to the invention, measured in a solution at 0.1% in decalin at 135° C, which may vary, as previously indicated, from 0.5 to 2, is preferably comprised between 0.7 and 1.7.

As to the polydispersity of said additives, which should be lower than 5, it is preferably lower than 4, and is more particularly comprised between 2 and 3.5.

It is to be reminded that the polydispersity of a polymere is defined by the value of the ratio of its weight average molecular weight $\overline{M}_w$ to its number average molecular weight $\overline{M}_n$.

Preferred polymer additives according to the invention are constituted by the terpolymers of ethylene and propene or butene-1 with one of the above mentioned nitrogenous monomers, mainly N-vinylimidazole, N-vinylimidazoline, N-vinylpyrrolidone, N-vinylcarbazole, N-allylphenothiazine and allythio-benzothiazole. The proportions (by weight) $x$, $y$ and $z$ of the units derived respectively from ethylene, propene or butene-1, and of the nitrogeneous monomer, are comprised within the previously defined limits and, according to a preferred embodiment of the invention, they are more particularly such that $20 \leq x \leq 75$, $20 \leq y \leq 75$ and $0.15 \leq z \leq 15$ with $(x + y + z) = 100$.

The polymer additives according to the invention may be substantially linear copolymers with a statistic distribution of the units by which they are constituted, or also graft copolymers in which the units derived from the nitrogenous heterocyclic monomers form pending chains linked to a skeleton constituted by an amorphous statistic copolymer of ethylene with the olefin having 3 to 6 carbon atoms or with olefins having 3 to 6 carbon atoms and the non-conjugated diene.

The statistic copolymers may be prepared by means of a coordination catalysis method wherein the ethylene, the olefin having 3 to 6 carbon atoms or the olefin having 3 to 6 carbon atoms and the non-conjugated diene, and the nitrogenous monomer or monomers are contacted, in a suitable solvent, with a catalyst of the Ziegler-Natta type, while, if required, the nitrogenous monomer is complexed by a Lewis acid.

The statistic copolymer may be prepared by coordination catalysis with complexation of the nitrogenous monomer, which method is described in the Luxemburg Pat. specification No. 69 836, wherein the nitrogenous monomer is derived from a lactam or a thiolactam, particularly N-vinylpyrrolidone or N-vinylthiopyrrolidone, and in the Luxemburg Pat. specification No. 69 835 wherein the nitrogenous monomer is of the vinylimadazole or vinylimidazoline type.

When the nitrogenous monomer is derived from carbazole, the statistic copolymer may be obtained by a method similar to that proposed in the French Pat. specification No. 1 585 298, while a method similar to that described in the French Pat. specification No. 2 087 214 may be used to prepare the statistic copolymer when the nitrogenous monomer is derived from thiobenzothiazole or phenothiazine.

The method of the Luxemburg Pat. specification No. 69 836 may also be used for preparing the statistic copolymer according to the invention when the nitrogenous monomer is derived from carbazole, thiobenzothiazole or phenothiazine.

Graft copolymers are obtained by grafting a convenient amount of one or more of the previously mentioned nitrogenous heterocyclic monomers onto an amorphous copolymer of ethylene with the olefin having 3 to 6 carbon atoms, especially propene or butene-1, or with the olefin having 3 to 6 carbon atoms and the non-conjugated diene, which has a viscosity and a polydispersity comprised within the above defined ranges, i.e. a reduced viscosity comprised between 0.5 and 2, and a polydispersity lower than 5.

The grafting method is not critical and any grafting method known in the art may be used to graft a vinyl monomer onto an olefin copolymer. For example, the grafting may be performed by dissolving the amorphous copolymer in a solvent, particularly an hydrocarbon, adding a free radical generator, e.g. a peroxide, then heating the mixture obtained to the grafting temperature and maintaining it at the temperature long enough to form active sites on the copolymer, then adding a suitable amount nitrogenous heterocyclic monomer and reacting the mixture obtained at the grafting temperature in order to form the graft copolymer. The graft copolymer is then separated from the reaction medium, for example by washing the graft copolymer solution by means of a suitable solvent, preferably a solvent of the nitrogenous monomer and of the corresponding homopolymers, then, after decantation, precipitating the polymer contained in the organic phase with isopropanol. The graft polymer is then dried in a known manner in an oven.

When preparing the polymer additive by statistic copolymerisation or by grafting it may be advantageous to operate in a solvent composed of an oil of the same composition as that of the oil to which the additive is to be added, as it is not then necessary to isolate the additive which may be collected in the form of a concentrated solution in the oil used as a solvent.

The incorporation of the polymer additive in the lubricating oil may be performed by any known method. In most cases, concentrated solutions of additives, called mother solutions, are prepared and diluted at the time they are used, to obtain the desired additive concentration in the lubricating composition.

The polymer additive concentration in the lubricating composition is generally about 0.2 to 10%, and preferably 0.5 to 5% by weight when said lubricating composition is ready for use. However stronger concentrations, e.g. 15 to 30% may be contemplated when the lubricating composition is in the form of a concentrate which is diluted in a suitable manner at the time it is used.

The lubricating oils to which the polymer additive is incorporated to form the lubricating compositions according to the invention may be natural or synthetic lubricating oils or mixtures thereof. Examples of such oils include vegetable oils such as castor oil, ordinary or refined mineral oils of a paraffinic and/or naphthenic type, hydrorefined oils, asphaltic oils, synthetic oils such as polybutenes, alkylbenzenes, particularly dinonylbenzene and tetradecylbenzene, the polyoxyalkylene aryl and alkyl ethers and/or esters such as polyisopropyleneglycol ethers and/or esters, the esters of dicarboxylic acids and of various alcohols such as dibutyl adipate and dioctylphthalate, the so-called silicone oils such, for example, polysiloxane, total or partial esters of phosphoric acid, particularly tricresylphosphate and phosphoric alkyl acids.

In addition to the polymer additives according to the invention, the lubricating compositions may also contain other additives commonly used in the art as corrosion inhibitors, antioxidants, dyes or defoaming agents.

The improved lubricating compositions according to the invention are particularly adapted to be used as crank-case oils for internal combustion engines, rear-axle oils, lubricants for gears or in the field of machining metals; they may also be used as lubricants for two-stroke engines.

The following non limitative examples are given to illustrate the invention:

EXAMPLE 1

Following an operating procedure similar to that described in example 1 of the Luxemburg Pat. specification No. 69 835, a certain number of amorphous statistic terpolymers of ethylene, propene and N-vinylimidazole were prepared by coordination catalysis (tests 1 to 10). The physico-chemical properties of these terpolymers, which are adapted to be used as polymer additives in the lubricating compositions according to the invention, are given in Table 1 hereinafter as compared to those of a reference sample, namely a copolymer of ethylene and propene (test 11) commercially available as an additive to improve the viscosity index of lubricating oils.

The polydispersity of the terpolymers is lower than that of the copolymer, which is an advantageous feature as far as their stability when submitted to mechanical shearing effects (or "shearing stability") is concerned.

TABLE I

| test n° ter-polymer n° | N-vinyl-imidazole content (weight %) | ethylene content (weight %) | reduced viscosity (decalin at 135° (C) | poly-di-spersity |
|---|---|---|---|---|
| 1 | 0.8 | 65.2 | 0.81 | 2.2 |
| 2 | 1.71 | 52.7 | 0.96 | 2.7 |
| 3 | 1.30 | 58.7 | 0.98 | |
| 4 | 0.47 | 64.1 | 1.09 | 2.6 |
| 5 | 0.32 | 61.8 | 1.11 | |
| 6 | 0.65 | 58.6 | 1.11 | |
| 7 | 0.64 | 69.9 | 1.24 | |
| 8 | 0.55 | 54.9 | 1.36 | |
| 9 | 0.29 | 57.5 | 1.40 | |
| 10 | 0.49 | 57.7 | 1.59 | |
| 11 | 0 | 54.4 | 1.10 | 3 |

To study the effect of the above mentioned terpolymers on viscosity index of the lubricating oils, the viscosity index determination according to the ASTM-D 2270 standard was made for lubricating compositions prepared by adding variable amounts of the terpolymers or of the reference copolymer to a reference oil, commercially designated "200 Neutral", which is neutral paraffinic oil extracted by means of a solvent, having a viscosity of 44.1 centistokes (abb.cst) at 37.8° C, and of 6.3 centistokes at 98.9° C, and a viscosity index ($VI_E$) of 100.

The results obtained have been listed in Table II. It should be recalled that the viscosity index of an oil is a number characterizing, on a conventional scale, the viscosity variation of that oil as a function of temperature; the slighter the variation, the higher the index.

TABLE II

| terpolymer n° | "200 Neutral" oil +0.9% by weight terpolymer | | | "200 Neutral" oil +1.2% by weight terpolymer | | | "200 Neutral" oil +1.5% by weight terpolymer | | |
|---|---|---|---|---|---|---|---|---|---|
| | Viscosity(cSt)at | | | Viscosity (cSt)at | | | Viscosity(cSt)at | | |
| | 37.8° C | 98.9° C | $VI_E$ | 37.8° C | 98.9° C | $VI_E$ | 37.8° C | 98.9° C | $VI_E$ |
| 1 | 74.88 | 9.74 | 120 | | | | 86.91 | 11.82 | 139 |
| 2 | 79.13 | 10.33 | 124 | | | | | | |
| 3 | 78.31 | 10.21 | 123 | | | | 96.56 | 12.67 | 137 |
| 4 | 90.14 | 11.51 | 127 | | | | | | |
| 5 | 88.4 | 11.7 | 134 | | | | | | |
| 6 | 75.8 | 10.2 | 128 | 88.94 | 11.94 | 137 | 108.04 | 14.01 | 140 |
| 7 | 77.94 | 10.53 | 131 | 90.45 | 12.17 | 139 | | | |
| 8 | 93.27 | 12.01 | 131 | | | | | | |
| 9 | 84.0 | 10.89 | 126 | 104.83 | 13.55 | 138 | 139.19 | 17.27 | 145 |
| 10 | 83.33 | 11.36 | 137 | 102.74 | 13.41 | 139 | | | |
| 11 | | | | | | | 100.3 | 12.99 | 136.5 |

By incorporating the terpolymers according to the invention to the reference oil the viscosity index of that oil is substantially improved. In addition, when comparing the results obtained with the terpolymer No. 6 and the reference copolymer No. 11, which have the same reduced viscosity, it can be seen that the terpolymer has a greater effect on the viscosity index than the reference copolymer.

Another advantage of these terpolymers resides in the fact that they have only a very slight thickening effect at low temperatures. Thus the viscosity of the lubricating composition containing 1.5% of terpolymer No. 6, as determined according to the ASTM-D 2602 standard, was only 26.5 poises.

Furthermore, the shearing stability of lubricating compositions (oil + polymer additive) was determined by means of the sonic decomposition test carried out according to the ASTM-D 2603 standard.

For that purpose, two series (A and B) of "oil + polymer additive" compositions were prepared. The A series compositions were constituted each by a base oil resulting from the mixture containing a) 72% by weight of an oil commercially designated "350 Neutral Solvent" oil (a neutral oil extracted by means of a solvent and having a viscosity of 9.15 cst at 98.9° C, a viscosity of 87.5 cst at 37.8° C and a viscosity index of 98), and b) 28% by weight "200 Neutral " oil with an addition of 1.2% by weight terpolymer; B series compositions were composed each only of the "200 Neutral" oil with an addition of various amounts of terpolymer No. 6.

Test samples of 50 ml of each composition were subjected to ultrasonic vibration for 10 minutes, the ultrasonic vibration generator being supplied with a current having an intensity equal to 0.9 ampere.

The viscosity at 98.9° C and 37.8° C of the various test portions as well as their viscosity index were determined before and after the shearing action due to the ultrasonic vibration, the decrease, expressed in %, of the viscosity or viscosity index after treatment providing a measure of the terpolymer decomposition.

The results of these tests are listed in Table III.

The small relative decrease of the viscosity and the viscosity index of the lubricating compositions indicates a satisfactory stability of the terpolymer when exposed to shearing effects. The lubricating compositions terpolymer No. 6, the viscosities at 98.9° C before and after passing through the injector were respectively 13.47 and 12.97 cst, which represented a relative decrease in viscosity of 3.7%, the viscosity index having the value 137 in both cases.

The dispersing properties of the terpolymer additives were determined by means of the test called "stain method" which was carried out at 20° C and 200°C in the following manner:

STAIN AT 20° C:

In a 60 ml flask, 1.4 g of a mother solution of terpolymer additive in a neutral oil of the "200 Neutral" type was poured, then filled up to 20 g with a used motor oil containing about 2.4% slurry (insoluble deposits), the mixture obtained containing then 1.05% terpolymer and 93% used oil. The mixture was finely divided and stirred for 2 minutes by means of a turbine rotating at 20 000 rpm, the temperature of the mixture rising to about 50° C, then the mixture thus prepared was allowed to rest for 12 hours.

TABLE IV

| test type | Slurry in used oil (% by weight) | polymer additive n° | evaluation mark (base 10*) |
|---|---|---|---|
| stain at 20° C | 2.4 | 1 | 9 |
| | | 2 | 9.7 |
| | | 3 | 7.5 |
| | | 4 | 9 |
| | | 5 | 9.5 |
| | | 6 | 10 |
| | | 7 | 6 |
| | | 8 | 7 |
| | | 9 | 8 |
| | | 10 | 8 |
| | | 11 | 0.5 |
| | 1.2 | 6 | 10 |
| | | 11 | 0.5 |
| stain at 200° C. | 2.4 | 6 | 9 |
| | | 11 | 0 |
| | 1.2 | 6 | 10 |
| | | 11 | 0 |

*The mark for the stain at 20° C in the case of "200 Neutral" oil without polymer additive was 0.5. The dispersing properties of the terpolymers according to the invention are retained, even at 200° C.

On a filter paper (commercially designated "Durieux No. 122") maintained flat, a drop of the mixture was

TABLE III

| Compositions | | | Viscosity at 98.9° C (cSt) | | | Viscosity at 37.8° C (cSt) | | | Viscosity index | | |
|---|---|---|---|---|---|---|---|---|---|---|---|
| series | terpolymer n° | weight % | before shear. | after shear. | % visco. | before shear. | after shear. | % visco. | bef. | aft. | % VI$_E$ |
| A | 5 | 1.2 | 16.24 | 15.63 | −3.9 | 143.73 | 137.15 | −4.6 | 129 | 128 | −0.8 |
| | 9 | 1.2 | 19.16 | 18.86 | −1.5 | 175.78 | 172.29 | −2 | 133 | 133 | 0 |
| | | 0.9 | 10.2 | 9.93 | −2.65 | 75.8 | 73.97 | −1.1 | 128 | 126 | −1.56 |
| B | 6 | 1.2 | 11.94 | 11.70 | −2 | 88.94 | 88.22 | −0.8 | 137 | 134 | −2.2 |
| | | 1.5 | 14.01 | 13.30 | −5.0 | 108.04 | 103.36 | −4.35 | 140 | 137 | −2.15 | containing the terpolymers according to the invention thus exhibit a satisfactory stability under mechanical shearing effects.

Another determination of the shearing stability of the compositions according to the invention was made by means of the ORBHAN test (German standard DIN 51 382) according to which the same sample of lubricating composition was run thirty times successively in a Bosch injector calibrated at 175 bars, the viscosity of said composition was measured before and after passing through the injector and the relative variations of viscosity and viscosity index provided a measure of the terpolymer decomposition.

In the case of the lubricating composition ("200 Neutral" oil + terpolymer) containing No. 1.4% by weight then deposited by means of a calibrated glass rod (6 mm diameter) placed 1 cm above the paper.

The stains were visually observed after 48 hours, and an evaluation mark from 0 to 10 was given to them according to the following marking method:

| Dispersion | Evaluation mark (base 10) |
|---|---|
| Very good | 9 to 10 |
| Good | 7 to 8 |
| Poor to average | 4 to 6 |
| Null to very bad | 0 to 1 |

STAIN AT 200° C

The sample was prepared in the same manner as for the stain test at 20° C, and also allowed to rest for 12 hours. 2 cm³ of the sample were then introduced into a test tube which was plunged for 3 minutes into an oil bath at 200° C. A drop of the sample oil was then immediately deposited on a filter paper as for the stain at 20° C, and a mark was given by visual observation 48 hours after, according to the evaluation marking method as previously described.

The results obtained are listed in Table IV.

The thermal and oxidation stability of the lubricating compositions was estimated by means of the hereinafter defined coking test:

Various lubricating compositions were prepared by adding to a "200 Neutral" base oil variable amounts of polymer additives and of 6% by weight of a mixed calcium and barium sulphonate as a detergent additive, said additive containing, by weight, 3.45% barium, 3.55% calcium and 2.25% sulphur.

450 ml of each of the compositions thus prepared was projected in fine droplets continuously on an aluminium beaker having a surface temperature maintained at 310° C. The device was substantially closed and the wall cooling gave rise to vapor condensation, providing thus an almost complete recirculaton of the tested oil. The test lasted 20 hours.

The deposits formed on the beaker were then weighed before and after washing with petroleum ether, the weight of said deposits indicating the thermal and oxidation stability of the tested oil.

Moreover, visual observatio allowed of evaluating the efficiency of the oil in dispersing the deposits.

According to French M07-019 (AFNOR) standard, the flash point in a closed vessel of said compositions was also determined after coking them.

The results of these tests are summarized in Table V.

TABLE V

| Polymer additive n° | polymer additive content of the base oil (% by weight) | deposit weight before washing (mg) | deposit weight after washing (mg) | flash point (° C) |
|---|---|---|---|---|
| 2 | 0.9 | 936 | 848 | 216 |
| 4 | 0.9 | 659 | 581 | 204 |
| 12+ | 3 | 1073 | 889 | 190 |
|  | 0 | 1343 | 1249 |  |

+This additive is a polymethacrylate commercially available under the designation "PLEXOL 956" as a dispersing additive for lubricating oils.

For the various compositions containing the polymer additives, the results of the visual evaluation of the dispersing effect were the same, but as shown by the values in Table V, the deposit weight was lower when using the terpolymers of the invention (Nos. 2 and 4) than when using the reference dispersing polymethacrylate (No. 12).

The advantageous oxidation behaviour of the lubricating oils according to the invention is also illustrated by the fact that the flash point, after coking, of the lubricating compositions containing the Nos. 2 and 4 terpolymers was significantly higher than that of the lubricating composition containing the reference dispersing additive of the polymethacrylate type.

EXAMPLE 2

Following an operating procedure similar to that described in example 5 of the Luxemburg Pat. specification No. 69 835, an amorphous statistic terpolymer of ethylene, propene and N-vinylimidazoline was prepared by coordination catalysis. Said terpolymer contained, by weight, 52% units derived from ethylene and 0.45% units derived from N-vinylimidazoline, and had a reduced viscosity of 1.20 (in decalin at 135° C) and a polydispersity of 2.6.

To determine the effect of the terpolymer thus prepared on the lubricating oils viscosity index, as well as its dispersing power, two series of lubricating compositions (oil + terpolymer) were prepared from a reference oil (200 Neutral), said compositions containing, by weight, the one 0.9% and the other 1.2% terpolymer, then their viscosity index ($VI_E$) was determined from their respective viscosities at 37.8° C and 98.9° C, in accordance with ASTM-D 2270 standard, as well as the terpolymer dispersing power by means of the "stain test" method (stain at 20° C) as described in example 1.

For the compositions containing, by weight, 1.2% terpolymer the viscosity at 37.8° C and 98.9° C was respectively 90.05 and 12.05 centistokes, which gave a viscosity index ($VI_E$) of 138.

For the compositions containing, by weight, 0.9% terpolymer, the viscosity at 37.8° C and 98.9° C was respectively 77.05 and 10.40 centistokes, which corresponded to a viscosity index of 130.

As to the dispersing effect, a 8.5 evaluation mark (base 10) was given in the stain method, which corresponded to a dispersion power ranging from "good" to "very good," therefore to a satisfactory dispersing power of the terpolymer.

EXAMPLE 3

A polymer additive according to the invention was prepared by grafting N-vinylimidazole on a copolymer of ethylene and porpene having an ethylene ponderal content of 48% (by weight), a reduced viscosity of 1.57 (as measured in decalin at 135° C) and a total ash content of 200 ppm.

In a 1 liter reactor provided with stirring means and maintained at 93° C by a thermostat, 300 ml heptane and 12 g ethylene/propene copolymer were introduced. 2 millimoles benzoyle peroxide was added and the mixture was raised to 93° C and maintained at that temperature for 45 minutes. 0.25 g N-vinylimidazole was then added and the temperature was maintained at 93° C for 2 hours.

The solution was then washed in the hot state with demineralized water and, after decantation, the polymer contained in the organic phase was precipitated by means of isopropanol.

The graft copolymer had a reduced viscosity of 1.20 and a N-vinylimidazole content of 0.3% by weight.

To evaluate the effect of the terpolymer thus prepared on the viscosity index of the lubricating oils, as well as its dispersing power, a lubricating composition (oil + graft terpolymer) containing, by weight, 1.2% terpolymer was prepared from a reference oil (200 Neutral), then its viscosity index was determined, as well as its dispersing power due to the incorporation of the terpolymer, as indicated in example 1.

The viscosity of the composition at 37.8° C and 98.9° C was respectively 89.59 and 12.96 centistokes, which corresponded to a viscosity index ($VI_E$) of 137.

As to the dispersing effect, an evaluation mark of 7 (base 10) was awarded in the "stain method" which indicated satisfactory dispersion properties, and thus satisfactory dispersing power of the graft terpolymer.

EXAMPLE 4

Following an operating procedure similar to that described in example 1 of Luxemburg Pat. specification No. 69 836, a number of amorphous statistic terpolymers of ethylene, propene and N-vinylpyrrolidone (tests 1 to 3 ) were prepared by coordination catalysis. Said terpolymers, which can be used as polymer additives in the lubricating compositions of the invetnion, have the physico-chemical properties listed in Table IV as compared to those of a reference sample, namely an ethylene/propene copolymer (test 4) commercially available as an additive for improving the viscosity index of lubricating oils.

TABLE VI

| test n° (polymer additive n° ) | N-vinyl pyrrolidone content (% by weight) | ethylene content (% by weight) | reduced viscosity (decalin at 135° C) | polydispersity |
|---|---|---|---|---|
| 21 | 1.8 | 70.3 | 0.98 | |
| 22 | 1.65 | 60.7 | 0.98 | 3 |
| 23 | 3.5 | 66.8 | 0.80 | 2.4 |
| 24 (reference) | 0 | 54.4 | 1.10 | 3 |

To study the effect of the above mentioned polymer additives on the lubricating oils viscosity index, the determination of the viscosity index was made according to ASTM-D 2270 standard, for lubricating compositions prepared by addition of variable amounts of said polymer additives (terpolymers and reference copolymer) to a reference oil (200 Neutral type), which was a solvent extracted neutral paraffinic oil having a viscosity of 44.1 centistokes (by abb. cst) at 37.8° C and of 6.3 centistokes at 98.9° C, and a viscosity index ($VI_E$) of 100.

The results obtained have been listed in Table VII.

The incorporation of the terpolymers according to the invention into the above mentioned lubricating oil substantially improves the viscosity index of that oil. Moreover, when comparing the results obtained, respectively, for the terpolymers (Nos. 22 and 23) and the reference copolymer (No. 24), it will be seen that the terpolymers had a stronger effect on the viscosity index than the reference copolymer.

The additives dispersing properties were evaluated by means of a test called "stain test method" which was carried out at 20° C, operating as indicated in example 1.

The results obtained have been listed in Table VIII.

TABLE VII

| polymer additive n° | "200 Neutral" oil +0.9% additive | | | "200 Neutral" oil + 1.5% additive | | |
|---|---|---|---|---|---|---|
| | Viscosity at | | | Viscosity at | | |
| | 37.8° C (cSt) | 98.9° C (cSt) | $VI_E$ | 37.8° C (cSt) | 98.9° C (cSt) | $VI_E$ |
| 22 | 72.45 | 9.74 | 125 | 96.86 | 12.70 | 137 |
| 23 | 65.64 | 9.07 | 125 | 83.42 | 11.54 | 140 |
| 24 | | | | 100.3 | 12.99 | 136.5 |

TABLE VIII

| test type | polymer additive, n° | Evaluation mark (base 10)* |
|---|---|---|
| stain at 20°C | 21 | 8 |
| | 22 | 8 |
| | 23 | 7.5 |
| | 24 (reference) | 0.5 |

*The evaluation mark for the stain at 20° C in the case of the "200 Neutral" oil without polymer additive was 0.5

The 0.5 mark given in the case of the composition containing the reference copolymer shows that the latter has no dispersing power.

On the contrary, for the terpolymer additives of the invention (Nos. 21 to 23) the evaluation marks awarded in the stain test correspond to a satisfactory dispersion quality, and therefore to a satisfactory dispersing power of the terpolymer used as an additive.

EXAMPLE 5

Following a working method smilar to that described in example 1 of the Luxemburg Pat. specification No. 69 836, amorphous statistic terpolymers of ethylene, propene and, respectively, N-vinylcarbazole, allyl-2 thiobenzothiazole, and N-allylphenothiazine, were prepared by coordination catalysis.

To determine the effect of the terpolymers thus prepared on the viscosity index of lubricating oils as well as their dispersing power, a series of lubricating compositions (oil + terpolymer) containing 1.2% by weight terpolymer were prepared from the "200 Neutral" reference oil, then the viscosity index ($VI_E$) of these compositions was determined from their viscosity at 37.8° C and 98.9° C, as indicated in the ASTM-D 2270 standard, and the dispersing power of the terpolymers by the "stain test" at 20° C, as described in example 1.

The physico-chemical properties of the terpolymers used as additives, the results indicating their effect on the viscosity index of the oil and their dispersing power are listed in Table IX.

The terpolymers according to the invention substantially improve the viscosity index of the reference oil. Moreover, the evaluation marks given the stain test correspond to a dispersion quality ranging from "good" to "very good," therefore to a satisfactory dispersing power of the terpolymer used as an additive.

TABLE IX

| Terpolymer additive | | | Lubricating composition | | | |
|---|---|---|---|---|---|---|
| Nitrogenous unit | | ethylene content (weight %) | reduced viscosity | Viscosity at | | | stain (mark out of 10) |
| Nature | % by weight | | | 37.8° C (cSt) | 98.9° C (cSt) | $VI_E$ | |
| N-vinyl-carbazole | 2.7 | 60.6 | 1.09 | 87.59 | 11.80 | 137 | 7 |
| Allyl-2 thio-benzothiazole | 1.2 | 55.3 | 1.33 | 97.65 | 12.90 | 139 | 9 |
| N-allyl phenothiazine | 1.7 | 684 | 1.19 | 89.38 | 11.98 | 137 | 8 |

EXAMPLE 6

Additives according to the invention were prepared by grafting, respectively, N-vinylpyrrolidone, N-vinylcarbazole, allyl-2 thiobenzothiazole and N-allylphenothiazine on a copolymer of ethylene and propene having an ethylene content of 48%, by weight, a reduced viscosity of 1.57 (in decalin at 135° C) and a total ash content of 200 ppm.

300 ml heptane and 12 g ethylene/propene copolymer were introduced into a 1 liter reactor provided with stirring means and maintained by a thermostat at 93° C. 2 millimoles of benzoyle peroxide was then added and the mixture was heated to 93° C and maintained at that temperature for 45 minutes. The required amount of nitrogenous monomer was then added, i.e. respectively 0.30 g N-vinylpyrrolidone, 0.40 g N-vinylcarbazole, 0.45 g allyl-2 thiobenzothiazole, or 0.52 g allylphenothiazine, and the solution was maintained at 93° C for 2 hours.

The solution was then washed with a solvent, namely, chloroform (grafting of vinylcarbazole and vinylpyrrolidone) or hot ethanol (grafting of allythiobenzothiazole or allylphenothiazine) and, after decantation, the polymer contained in the organic phase was precipitated by means of isopropanol.

To evaluate the effect of the graft terpolymers thus prepared on the viscosity index of the lubricating oil as well as their dispersing power, lubricating compositions (oil + graft terpolymer) containing, by weight, 1.5% terpolymer, were prepared from a reference oil (200 Neutral), then their viscosity index was determined, as well as their dispersing power stemming from the incorporation of the terpolymer, as indicated in example 1.

The results obtained during these tests, as well as the physico-chemical properties of the used graft terpolymers have been listed in Table X.

TABLE X

| Graft terpolymer | | | Lubricating composition | | | |
|---|---|---|---|---|---|---|
| nitrogenous unit | | reduced viscosity | viscosity at | | | Stain (evaluation mark base 10) |
| Nature | % by wt. | | 37.8° C cSt | 98.9° C cSt | $VI_E$ | |
| N-vinyl pyrrolidone | 0.45 | 1.17 | 110.15 | 14.01 | 138 | 7 |
| N-vinyl carbazole | 0.60 | 1.08 | 106.24 | 13.62 | 137 | 6.5 |
| Allyl-2-thio-benzothiazole | 0.30 | 1.10 | 107.10 | 13.66 | 137 | 6.45 |
| Allylpheno-thiazine | 0.25 | 1.03 | 99.68 | 12.91 | 136 | 6.2 |

What is claimed is:

1. Lubricating compositions comprising a major proportion of a lubricating oil and from about 0.2 to 10% by weight, based on the weight of said oil, of an oil-soluble polymer additive having a reduced viscosity, measured as a 0.1% solution in decalin at 135° C, between about 0.5 and 2, and a polydispersity less than 5 wherein said polymer additive is an olefinic copolymer containing, by weight, $x$ % units of ethylene, $y$ % units of mono-olefin having 3 to 6 carbon atoms or of a mono-olefin having 3 to 6 carbon atoms and a non conjugated diene, the proportion of units resulting from the diene being lower than or equal to 20%, and $z$ % units of one or more nitrogenous monomers selected from the group consisting of vinlimidazoles, vinylimidazolines, hydrocarbon substituted vinylimidazoles, hydrocarbon substituted vinylimidazolines, aminohydrocarbon substituted vinyl imidazoles, aminohydrocarbon substituted vinyl imidazolines, nitrogeneous heterocyclic monomers of formula R-B where R is a monovalent alkenyl radical having 2 to 12 carbon atoms, and B is a monovalent heterocyclic group obtained by loss of the hydrogen atom linked to the substitutable heteroatom of a heterocyclic compound selected from the group consisting of carbazole, hydrocarbon substituted carbazole, and aminohydrocarbon substituted carbazole, the values of $x$, $y$ and $z$ being such that $5 < x < 75$, $5 < y < 85$ and $0.1 < z < 20$ with the proviso that $x + y + z = 100$, said copolymer thereby improving the viscosity index ($VI_E$) of said oil and dispersing the slurry it may contain.

2. Lubricating compositions of claim 1, wherein nitrogenous monomers giving rise to the nitrogenous units of the polymer additive are selected from the group consisting of N-alkenyl carbazoles in which the alkenyl radical has 2 to 8 carbon atoms, and the hydrocarbon-substituted derivitives thereof, said derivatives being obtained by substitution of the hydrogen atoms linked to the heterocyclic nuclear carbons by alkyl or phenyl radicals said alkyl radicals having 1 to 6 carbon atoms.

3. Lubricating compositions of claim 1, wherein the monomers giving rise to the nitrogenous units of the polymer additive are selected from the group consisting of vinylimidazoles carrying the vinyl radical in the 1 or 2 position, vinylimidazoline carrying the vinyl radical in the 1 or 2 position, hydrocarbon substituted vinylimidazoles carrying the vinyl radical in the 1 or 2 position, hydrocarbon substituted vinylimidazolines carrying the vinyl radical in the 1 or 2 position, aminohydrocarbon substituted vinylimidazoles,, and aminohydrocarbon substituted vinylimidazolines, wherein said hydrocarbon and aminohydrocarbon substituents are selected from the group consisting of alkyl, aryl, aralkyl, alkaryl radicals and the corresponding amino substituted radicals having from 1 to 8 carbon atoms.

4. Lubricating compositions according to claim 1, wherein the monomers giving rise to the nitrogenous units of the polymer additive are selected from the group consisting of hydrocarbon substituted vinylimidazoles, hydrocarbon substituted vinylimidazolines, aminohydrocarbon substituted vinylimidazoles and aminohydrocarbon substituted vinylimidazolines, wherein said hydrocarbon and amino hydrocarbon substitutents are selected from the group consisting of divalent hydrocarbon groups and the corresponding aminated groups which have 4 to 8 carbon atoms and are linked to two adjacent carbon atoms of the heterocyclic nucleus of said vinylimidazole or vinylimidazoline to form with said adjacent carbon atoms an additional aromatic nucleus.

5. Lubricating compositions of claim 1, wherein the copolymer is a terpolymer of ethylene and propene or butene-1 with one or more nitrogenous monomers selected from the group consisting of N-vinylimidazole, N-vinylimidazoline, and N-vinylcarbazole.

6. Lubricating compositions of claim 1, wherein said reduced viscosity of the copolymer additive is between 0.7 and 1.7.

7. Lubricating compositions of claim 1, wherein the poly dispersity of the copolymer additive is less than 4.

8. Lubricating compositions of claim 5, wherein said proportions $x$, $y$ and $z$ of the units constituting the copolymer are $20<x<75$, $20<y<75$ and $0.15<z<15$.

9. Lubricating compositions of claim 1, wherein the copolymer is a random copolymer obtained by coordination catalysis with complexation of the nitrogenous heterocyclic monomer by a Lewis acid.

10. Lubricating compositions of claim 1, wherein the copolymer is a graft copolymer resulting from the grafting of one or more nitrogenous monomers onto an amorphous copolymer of ethylene with olefins having 3 to 6 carbon atoms, or with olefins having 3 to 6 carbon atoms and non-conjugated dienes.

11. Lubricating compositions of claim 10, wherein said amorphous copolymer has a reduced viscosity between about 0.5 and 2 and a polydispersity less than 5.

12. Lubricating compositions of claim 11, wherein said amorphous copolymer has a reduced viscosity between about 0.7 and 1.7 and a polydispersity less than 4.

13. A lubricating composition of claim 5, wherein said terpolymer is a terpolymer of ethylene, propene and N-vinylimidazole.

14. A lubricating composition of claim 5, wherein said terpolymer is a terpolymer of ethylene, propene and N-vinylimidazoline.

15. A lubricating composition of claim 14, wherein said terpolymer contains by weight 52 % units derived from ethylene and 0.45 % units derived from N-vinylimidazoline.

16. A lubricating composition of claim 2, wherein said nitrogenous monomer is selected from the group consisting of N-alkenylcarbazoles wherein said alkenyl radical contains 2 to 8 carbon atoms with the alkenyl unsaturation being in the $\omega$ position relative to the heteroatom to which it is linked and derivatives of said N-alkenylcarbazoles which are obtained by substitution of hydrogen atoms linked to the heterocyclic nuclear carbon atoms by alkyl radicals having 1 to 6 carbon atoms or phenyl radicals.

17. A lubricating composition of claim 7, wherein the polydispersity of the copolymer additive is between about 2 and 3.5.

18. A lubricating composition of claim 12, wherein the amorphous copolymer has a reduced viscosity between about 2 and 3.5.

* * * * *

UNITED STATES PATENT OFFICE
CERTIFICATE OF CORRECTION

Patent No. 4,092,255  Dated May 30, 1978

Inventor(s) Gilbert Chapelet, et al

It is certified that error appears in the above-identified patent and that said Letters Patent are hereby corrected as shown below:

Column 1, line 58: "cntaining" should be --containing--.

Column 2, line 28: "havng" should be --having--.

Column 3, line 16: "alkenyll-2" should be --alkenyl-2--.

line 44: "Caprolactam" should be --caprolactam--.

line 65: "allythio-benzo-" should be --allythiobenzo- --.

Column 9, line 33: "observatio"should be --observation--.

Column 7, last line: Cancel "No.".

Column 10, line 36: "porpene" should be --propene--.

Column 11, line 9: "invetnion" should be --invention--.

line 10: "IV" should be --VI--.

Column 14, line 19: "vinlimidazoles" should be --vinylimidazoles--.

line 41" derivitives" should be --derivatives--.

UNITED STATES PATENT OFFICE
CERTIFICATE OF CORRECTION

Patent No. 4,092,255                    Dated May 30, 1978

Inventor(s) Gilbert Chapelet, et al

It is certified that error appears in the above-identified patent and that said Letters Patent are hereby corrected as shown below:

Column 14, line 64:   "vinylimidazoline" should be
                      --vinylimidazolines--.

Signed and Sealed this

Ninth Day of January 1979

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

Patent No. 4,092,255          Dated May 30, 1978

Inventor(s) Gilbert Chapelet, et al

It is certified that error appears in the above-identified patent and that said Letters Patent are hereby corrected as shown below:

Title Page, first column, lines 8-10: "[73] Assignee:

Entreprise de Recherches et D'Activites Petrolieres (ERAP), Paris, France" should be --[73] Assignee:

Societe Nationale Elf Aquitaine, Paris, France--.

*Signed and Sealed this*

*Second Day of October 1979*

[SEAL]

Attest:

RUTH C. MASON
*Attesting Officer*

LUTRELLE F. PARKER
*Acting Commissioner of Patents and Trademarks*